Sept. 20, 1938.  J. W. RUSH  2,130,633
VARIABLE LOAD BRAKE
Filed Dec. 1, 1936
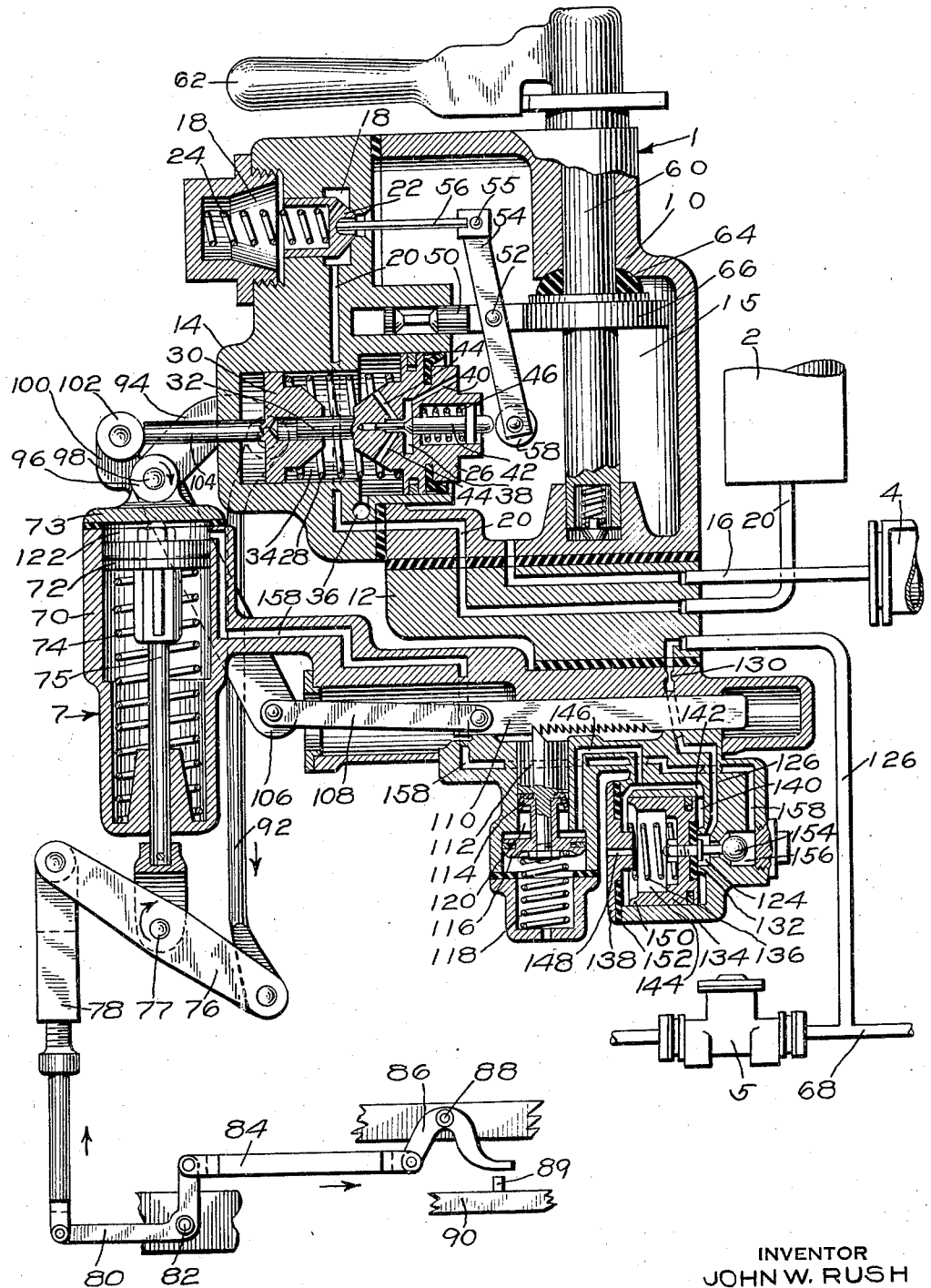
INVENTOR
JOHN W. RUSH
BY *Wm. H. Cady*
ATTORNEY Patented Sept. 20, 1938

2,130,633

UNITED STATES PATENT OFFICE 2,130,633

VARIABLE LOAD BRAKE

John W. Rush, Wilkinsburg, Pa., assignor to The Westinghouse Air Brake Company, Wilmerding, Pa., a corporation of Pennsylvania Application December 1, 1936, Serial No. 113,629

1 Claim. (Cl. 303—22)

This invention relates to vehicle brake apparatus and more particularly to a brake equipment incorporating means for varying the braking power in accordance with the load on the vehicle. It is an object of this invention to provide a vehicle brake apparatus having a manually operated self-lapping valve device for controlling the pressure of the fluid supplied to the brake cylinder on the vehicle, and having means responsive to the load on the vehicle for modifying the operation of the self-lapping valve device and thereby varying the degree of braking power on the vehicle.

Another object of the invention is to provide an improved variable load brake equipment.

Other objects of the invention and features of novelty will be apparent from the following description taken in connection with the accompanying drawing, the single figure of which is a diagrammatic view, largely in section, of a vehicle brake equipment embodying my invention.

Referring to the drawing, the brake equipment provided by this invention comprises a self-lapping valve device indicated generally by the reference numeral 1, a reservoir 2, a brake cylinder 4, a door engine 5, and load responsive means indicated general by the reference numeral 7.

The self-lapping valve mechanism shown in the drawing is of the type shown and claimed in U. S. Patent No. 2,042,112, issued May 26, 1936, to Ewing K. Lynn and Rankin J. Bush, and comprises a main casing section 10, a pipe bracket section 12, and a valve section 14, which when secured together form a pressure chamber 15, which is constantly connected by way of a passage and pipe 16 with the brake cylinder 4.

The valve section 14 has a chamber 18 formed therein which is constantly connected by way of a passage and pipe 20 with the reservoir 2. The chamber 18 has a supply valve 22 mounted therein and this valve is yieldingly urged to the seated position by means of a spring 24 to cut off communication between the chamber 18 and the pressure chamber 15.

The valve section 14 has a bore therein in which is mounted a movable abutment in the form of a piston 26 which is subject to the opposing pressures of the fluid in the pressure chamber 15 and of a spring 28, which extends between the piston 26 and a movable spring seat 30 which is slidable in a bore in the valve section 14. The spring seat 30 has a bore therein into which extends a reduced extension 32 formed integral with the piston 26.

The chamber 34 at the spring side of the piston 26 is constantly connected with the atmosphere by way of a passage 36.

The piston 26 has a valve chamber 38 formed therein which is constantly connected with the pressure chamber 15 by way of passages 40, one of which is shown in the drawing. A release valve 42 is mounted in the chamber 38 and is adapted to engage a seat formed on the piston 26 to cut off communication between the chamber 38 and the chamber 34 through passages 44. The release valve 42 has a flange formed thereon, while a spring 46 extends between this flange and the piston 26 and yieldingly urges the release valve away from its seat.

The valve section 14 has, in addition, a bore formed therein in which is mounted a floating pivot carrier 50 on which is pivotally secured intermediate its ends by means of a pin 52, a lever 54, one end of which has pivotally secured thereto on a pin 55 a member 56 which extends into a recess in the face of the supply valve 22.

The other end of the lever 54 has mounted thereon a roller 58, which is adapted to engage the rounded end of the release valve 42.

The springs 24, 28 and 46 are of different values, and are proportioned so that the spring 24 exerts substantially greater force than the spring 46, but less force than the spring 28.

The main casing section 10 has a bore extending through the wall thereof, while a shaft 60 is journaled in this bore and has secured to the exposed end thereof a manual operating handle 62. The shaft 60 has packing indicated at 64 mounted thereon to prevent the escape of fluid under pressure from the pressure chamber 15 to the atmosphere through the bore in which the shaft 60 is mounted, while the shaft 60 has, in addition, a cam 66 secured thereon and adapted to engage the end of the floating pivot carrier 50.

The door engine 5 may be of any suitable well known construction, and is operated on the supply of fluid under pressure by way of the pipe 68 to open the vehicle door, and on the release of fluid under pressure from the pipe 68 to effect closing of the vehicle door.

The load responsive means 7 comprises a strut cylinder 70 supported on the pipe bracket section 12 from the vehicle body and having a bore therein in which is mounted a piston 72. The piston 72 is yieldingly urged to the upper end of the cylinder 70 into engagement with a cover 73 by means of a spring 74, while the piston has a stem 75 which extends through, and is guided by, a bore in the end wall of the cylinder 70. A lever 76 is pivotally mounted intermediate its ends on the end of the stem 75 by means of a pin 77, and one end of this lever is connected by means of a link 78 with one arm of a bell crank 80, which is pivotally supported on the vehicle body by means of a pin 82.

The other arm of the bell crank 80 is connected by means of a link 84 with one arm of a bell crank 86, which is pivotally supported on the vehicle body by means of a pin 88. The other arm of the bell crank 86 is adapted to engage a projection 89 carried by an unsprung portion 90 of one of the vehicle trucks.

The other arm of the lever 76 is connected by means of a link 92 with an arm 94 of a lever indicated generally by the reference numeral 96, which is pivotally supported on the cover 73 by means of a pin 98.

The lever 96 has, in addition, an arm 100 on which is mounted a roller 102 which is adapted to engage the end of a stem 104 formed integral with the spring seat 30 and extending through a bore in the wall of the valve section 14.

The lever 96 also has an arm 106 which is connected by means of a link 108 to a ratchet bar 110, which is slidably mounted in the body of the load responsive mechanism 7.

The teeth on the ratchet bar 110 are engaged by a pawl 112 which is mounted in a bore in the body of the load responsive mechanism and has secured thereto a piston 114 of relatively small diameter, and a piston 116 of relatively large diameter. A spring 118 operates through the pistons 114 and 116 to press the pawl 112 against the ratchet bar 110.

The load responsive means includes, in addition, valve means responsive to the pressure of the fluid supplied by way of the pipe 68 to the door engine 5 to control the supply of fluid under pressure to the chamber 120 intermediate the pistons 114 and 116, and to the chamber 122 at the face of the piston 72.

As illustrated, this valve means comprises a body having a chamber 124 therein which is constantly connected by way of a passage and pipe 126 with the pipe 68 leading to the door engine 5. The passage 126 has a choke indicated at 130 interposed therein to restrict the rate of flow of fluid from the pipe 68 through the passage 126.

The chamber 124 is surrounded by an annular seat rib 132 which is engaged by a sealing gasket carried by the face of a valve piston 134 mounted in a bore in the body of the load responsive mechanism. A spring 136 extends between the valve piston 134 and a cover plate 138 and yieldingly urges the valve piston 134 to the right, as viewed in the drawing, so that the sealing gasket carried thereby engages the seat rib 132. In this position of the valve piston 134, the chamber 140 outwardly of the seat rib 132 is connected by way of a passage 142 with the chamber 144 at the spring side of the valve piston 134. A passage 146 communicates with the passage 142 and with the chamber 120 intermediate the pistons 114 and 116.

The chamber 144 at the spring side of the piston 134 is constantly connected by way of a passage 148 with the atmosphere, while the valve piston 134 has an annular seat rib 150 formed thereon which is adapted to engage a gasket 152 carried by the cover plate 138 to cut off communication between the passage 142 and the chamber 144 on movement of the valve piston 134 against the spring 136.

The valve piston 134 has secured thereto a stem carrying a spherical valve element 154 which is mounted in a chamber 156, which is constantly connected by way of a passage 158 with the chamber 122 at the face of the piston 72. The valve element 154 is adapted to engage a seat surrounding a passage communicating with the chamber 124 and the chamber 156 to cut off communication between these chambers.

The equipment is shown in the drawing with the brakes released, the car doors closed and with the load on the car approximately at the minimum. At this time fluid under pressure flows from the reservoir 2 by way of the pipe and passage 20 to the chamber 18, but as the supply valve 22 is seated fluid under pressure cannot flow to the pressure chamber 15, while the pressure chamber 15 and the brake cylinder 2 are connected to the atmosphere as the release valve 42 is held away from its seat by the spring 46.

At this time the pipe 68 is connected to the atmosphere so that fluid is released from the chamber 124, thereby permitting the spring 136 to hold the valve piston 134 in engagement with the seat rib 132 and hold the seat rib 150 on the valve piston away from the sealing gasket 152 to permit communication between the passage 142 and the chamber 144 at the spring side of the valve piston with the result that the chamber 120 intermediate the pistons 114 and 116 associated with the latch 112 is connected to the atmosphere and the spring 118 maintains the pawl 112 in engagement with the ratchet bar 110.

In this position of the valve piston 134, the valve element 154 is held away from its seat so that the chamber 122 at the face of the piston 72 is connected to the chamber 124 and to the atmosphere by way of the pipe 68. As the chamber 122 is connected to the atmosphere, the piston 72 is held in engagement with the cover 73 by the spring 74.

If, at this time, the operator desires to effect an application of the brakes he may do so by turning the handle 62 from the release position to a point in the application zone. On this movement of the handle 62, the shaft 60 and the cam 66 are turned and the face of the cam presses upon the end of the floating pivot carrier 50, moving it to the left as viewed in the drawing. On this movement of the floating pivot carrier 50 the lever 54 is moved. The upper end of this lever, however, is prevented from moving as the member 56 presses against the supply valve 22, which is held in the seated position by the spring 24, which is of moderate strength. The lever 54, therefore, will pivot about the pin 55 and the roller 58 will press against the end of the release valve 42 and move it against the relatively weak spring 46 until the release valve 42 engages the seat on the piston 26, which is prevented from moving by the relatively heavy spring 28.

On movement of the release valve 42 to the seated position, and on further movement of the floating pivot carrier 50, the lower end of the lever 54 is prevented from moving and the lever pivots on the roller 58 with the result that the upper end of the lever presses through the member 56 and moves the supply valve 22 away from its seat against the spring 24 to thereby permit fluid under pressure supplied from the reservoir 2 by way of the passage 20 to flow to the pressure chamber 15, and therefrom by way of the passage and pipe 16 to the brake cylinder 4.

On an increase in the pressure of the fluid in the pressure chamber 15, force is exerted by this fluid on the piston 26 tending to move it to the left, as viewed in the drawing, against the relatively heavy spring 28. On this movement of the piston 26, the spring 24 moves the supply valve 22 toward its seat and operates through the supply valve and the member 56 to cause the lever 54 to pivot on the pin 52 and maintain the release valve 42 in the seated position against the spring 46.

When the pressure of the fluid in the pressure chamber 15 has increased to a predetermined value, dependent upon the amount of movement of the handle 62 and of the adjustment of the spring 28, the force exerted by this fluid on the piston 26 will be sufficient to move the piston far enough against the spring 28 to permit the supply valve 22 to be moved to the seated position by the spring 24 to thereby cut off the supply of fluid under pressure from the reservoir 2 to the pressure chamber 15 and to the brake cylinder 4.

In order to release the brakes after an application, the operator turns the handle 62 to the release position, thereby moving the cam 66 so that the face thereof is moved away from the end of the floating pivot carrier 50. As the supply valve 22 is in the seated position at this time, the spring 24 is ineffective to exert force upon the lever 54, and the spring 46, therefore, moves the release valve 42 away from its seat, thereby moving the lower end of the lever 54 to the right and moving the end of the floating pivot carrier 50 towards the face of the cam 66.

On movement of the release valve 42 away from its seat, fluid under pressure may escape from the brake cylinder 4 and the pressure chamber 15 by way of the passages 40, the chamber 38 in the piston 26, through the passages 44 to the chamber 34 at the spring side of the piston 26 and thence to the atmosphere by way of the passage 38.

On a reduction in the pressure of the fluid in the chamber 15, there is a corresponding reduction in the force exerted by this fluid on the piston 26 in opposition to the spring 28, and the spring 28, therefore, will expand and will move the piston 26 to the right, as viewed in the drawing, thereby moving the lower end of the lever 54 to the right, while the floating pivot carrier 50 is moved towards the face of the cam 56. When the handle 62 is in the release position, however, the spring 28 can expand to its full length without moving the piston 26 far enough to press the end of the floating pivot carrier 50 against the face of the cam 66 and cause the release valve 42 to be seated, with the result that all of the fluid under pressure in the pressure chamber 15 and in the brake cylinder 4 may escape to the atmosphere.

When the car doors are to be opened, fluid under pressure is supplied by valve means, not shown, to the pipe 68 leading to the door engine 5 to condition this engine to open the car doors. Fluid under pressure supplied to the pipe 68 flows therefrom by way of the pipe and passage 126 and through the choke 130 at a restricted rate to the chamber 124, from which it flows past the unseated valve 154 to the chamber 156 and thence by way of the passage 158 to the chamber 122 at the face of the piston 72.

On an increase in the pressure of the fluid in the chamber 122, the piston 72 is moved downwardly against the opposing force of the spring 74. This movement of the piston 72 is transmitted through the stem 75 and causes the lever 76 to pivot about the lower end of the link 92, with the result that the lever 76 operates through the link 78 to move the bell crank 80 in a counter-clockwise direction about the pin 82. This movement of the bell crank 80 is transmitted through the link 84 to the bell crank 86 to move it in a clockwise direction about the pin 88 until the end of the bell crank engages the projection 89 associated with the unsprung portion 90 of the vehicle truck.

When the arm of the bell crank 86 engages the projection 89, further movement of the bell crank is prevented, and similarly further movement of the link 84, the bell crank 80 and the link 78 is prevented so that the force exerted by the fluid under pressure in the chamber 122 on the piston 72 tends to cause the lever 76 to pivot about the upper end of the link 78 and move the link 92 downwardly.

The force exerted on the link 92 tending to move it downwardly is transmitted to the arm 94 of the lever 96 tending to move the lever 96 in a clockwise direction about the pin 98 on which it is supported on the cover 73. This movement of the lever 96 causes the end of the arm 106 to tend to move to the left, as viewed in the drawing, but this movement of the arm 106 is prevented as the ratchet bar 110 is held by the pawl 112, which is yieldingly pressed into engagement with the ratchet bar 110 by means of the spring 118.

The spring 136 is proportioned so as to maintain the valve piston 134 in engagement with the seat rib 132 until the pressure of the fluid in the chamber 124, and in the chamber 122 at the face of the piston 72, has increased to a value high enough to move the piston 72 against the spring 74 until further movement of the piston 72 is prevented by engagement of the arm of the bell crank 86 with the projection 89 on the unsprung portion 90 of the vehicle truck.

On a further increase in the pressure of the fluid in the chamber 124 the force exerted thereby on the face of the valve piston 134 within the seat rib 132 is great enough to overcome the opposing force of the spring 136 so that the valve piston 134 is moved away from the seat rib 132, thereby permitting fluid under pressure to flow to the chamber 140 outwardly of the seat rib 132 and exposing the entire face of the valve piston 134 to fluid under pressure. On this increase in the area of the valve piston 134 subject to fluid under pressure, there is a substantial increase in the force exerted on the valve piston 134, and it is thereafter rapidly moved against the spring 136 until the annular seat rib 150 thereon engages the sealing gasket 152 to cut off communication between the passage 142 and the chamber 144 at the spring side of the valve piston.

On this movement of the piston 134, the stem carried thereby is moved so as to move the spherical valve element 154 into engagement with its seat to cut off the further supply of fluid under pressure from the chamber 124 to the chamber 156, and thence by way of the passage 158 to the chamber 122 at the face of the piston 72.

On movement of the valve piston 134 away from the seat rib 132, fluid under pressure flows from the chamber 124 to the chamber 140 outwardly of the seat rib 132, and thence by way of the passage 142 to the passage 146 leading to the chamber 120 intermediate the pistons 114 and 116. On an increase in the pressure of the fluid in the chamber 120, this fluid acts upon the differential areas of the pistons 114 and 116 and exerts force on the piston 116 to move it downwardly against the opposing force of the spring 118, thereby moving the pawl 112 away from the ratchet bar 110.

If, while the vehicle doors are open, the load on the vehicle is increased, as by an increase in the number of passengers on the vehicle, the vehicle springs will be compressed and the body of the vehicle will move somewhat closer to the unsprung portion 90 of the vehicle truck. As a result of this downward movement of the vehicle body the arm of the bell crank 86 will press against the projection 89 and the bell crank 86 will be turned about the pin 88 in a counterclockwise direction an amount in accordance with the degree of compression of the vehicle springs and, therefore, in accordance with the increase in the load on the vehicle. This movement of the bell crank 86 is transmitted through the link 84 to the bell crank 80 to turn it in a clockwise direction about the pin 82. This movement of the bell crank 80 is transmitted through the link 78 to the lever 76 and causes this lever to pivot in a clockwise direction about the pin 77 on which it is attached to the stem 75. On this movement of the lever 76, force is exerted on the link 92 to move it downwardly, and this force is transmitted to the arm 94 of the lever 96 to move this lever in a clockwise direction about the pin 98. On this movement of the lever 96, the arm 106 thereof is moved and its movement is transmitted through the link 108 to the ratchet bar 110 to move it to the left, as viewed in the drawing. The ratchet bar 110 is free to move at this time as the pawl 112 has been moved out of engagement with the teeth on the ratchet bar.

On movement of the lever 96 in a clockwise direction about the pin 98, the arm 100 on this lever is turned so that the roller 102 carried thereby presses against the end of the stem 104 and moves this stem and the spring seat 30 to the right, as viewed in the drawing.

The amount of movement of the spring seat 30 is determined by the amount of movement of the bell crank 86, which, as pointed out above, varies in accordance with the increase in the load on the vehicle.

When the doors are to be closed, the operator releases fluid under pressure from the pipe 68 by valve means, not shown, and the door engine 5 is thereupon operated to effect closing of the doors of the vehicle. On the release of fluid under pressure from the pipe 68 fluid flows thereto from the chamber 120 intermediate the pistons 114 and 116 by way of the passage 146, the passage 142, the chambers 140 and 124 at the face of the valve piston 134, and the passage and pipe 126.

On a reduction to a predetermined value in the pressure of the fluid in the chamber 120, the force exerted by this fluid under pressure on the differential areas of the pistons 114 and 116 is insufficient to maintain these pistons against the opposing force of the spring 118, and these pistons and the pawl 112 are thereupon moved upwardly, as viewed in the drawing, by the spring 118 so that the pawl 112 engages the teeth in the ratchet bar 110 to maintain the ratchet bar 110 in the position to which it has been moved.

On a reduction in the pressure of the fluid in the chambers 140 and 124 at the face of the valve piston 134 to a value somewhat lower than is required to maintain the pistons 114 and 116 against the spring 118, the force exerted by this fluid under pressure on the valve piston 134 is insufficient to maintain it against the opposing force of the spring 136 and the valve piston 134 is thereupon moved into engagement with the seat rib 132, while the seat rib 150 on the piston 134 is moved away from the sealing gasket 152.

On movement of the valve piston 134 into engagement with the seat rib 132, any fluid under pressure remaining in the chamber 120 may escape therefrom by way of the passage 146 and the passage 142 to the chamber 144 at the spring side of the piston 134, from which it flows to the atmosphere by way of the passage 148.

On movement of the valve piston 134 into engagement with the seat rib 132 the spherical valve element 154 is moved away from its seat, thereby permitting fluid under pressure in the chamber 122 which flows by way of the passage 158 to the chamber 156 to flow to the chamber 126, and thence to the pipe 68 through which it is released to the atmosphere. On the release of fluid under pressure from the chamber 122 at the face of the piston 72, the piston 72 is moved upwardly by the spring 74.

At this time the lever 96 is prevented from moving as the arm 106 thereof is connected by means of the link 108 to the ratchet bar 110, which is held by the pawl 112. As a result, therefore, the spring seat 30 is prevented from moving farther to the left, as viewed in the drawing, and on upward movement of the piston 72 by the spring 74 the lever 76 pivots about the lower end of the link 92 with the result that force is exerted on the link 78 to move it upwardly, as viewed in the drawing, thereby tending to move the bell crank 80 in a clockwise direction. Force exerted on the bell crank 80 is transmitted through the link 84 to the bell crank 86 to move it about the pin 88 and press the end thereof against the projection 89 associated with the portion 90 of the vehicle truck. On engagement of the bell crank 86 with the projection 89 further upward movement of the piston 72 by the spring 74 is prevented.

If now the operator wishes to apply the brakes he turns the handle 62 from the release position to a point in the application zone. On this movement of the handle 62 the shaft 60 is turned and the cam 66 is moved so that the face thereof presses against the end of the floating pivot carrier 50 and moves it to the left, as viewed in the drawing. On this movement of the floating pivot carrier 50 the lever 54 initially pivots about the end of the member 56 with the result that the roller 58 presses against the end of the release valve 42 and moves the release valve against the relatively weak spring 46 into engagement with the seat on the piston 26 to cut off the communication between the pressure chamber 15 and the atmosphere through the ports 44. On further movement of the floating pivot carrier 50 by the cam 66, the lever 54 pivots on the roller 58 and the upper end of the lever operates through the member 56 to press the supply valve 22 away from its seat against the opposing force of the spring 24, thereby permitting fluid under pressure supplied from the reservoir 2 by way of the passage and pipe 20 to flow to the pressure chamber 15 and thence to the brake cylinder 4 by way of the passage and pipe 16.

As the piston 26 has been moved to the right, as viewed in the drawing, by the load responsive means acting through the spring 28 from the position which is previously occupied, the release valve 42 will be moved into engagement with its seat on a smaller movement of the floating pivot carrier 50 than was previously required, and accordingly the release valve 42 will be moved to the seated position on a smaller movement of the handle 62 away from the release position than was previously required, while the supply valve 22 is likewise unseated as a result of a smaller movement of the handle 62.

On an increase in the pressure of the fluid in the chamber 15 there is a corresponding increase in the force exerted on the piston 26 to move this piston against the spring 28. On movement of the piston 26 against the spring 28 the spring 24 acting through the supply valve 22 and the member 56 causes the floating pivot carrier 50 to be held in engagement with the face of the cam 66, while the lever 54 pivots on the pin 52 and the roller 58 is pressed against the end of the release valve 42 to maintain it in the seated position against the opposing force of the relatively weak spring 46.

As the pressure of the fluid in the chamber 15 continues to increase the piston 26 is moved farther against the opposing force of the spring 28, compressing this spring somewhat, while the supply valve 22 is moved towards the seated position by the spring 24. When the pressure of the fluid in the chamber 15 has increased to a predetermined value, dependent upon the position to which the handle 62 has been turned, the piston 26 will have been moved far enough against the spring 28 to permit the spring 24 to move the supply valve 22 to the seated position to cut off the further supply of fluid under pressure to the pressure chamber 15 and to the brake cylinder 4.

As the spring seat 30 has been moved to the right by the load responsive mechanism, the piston 26 must compress the spring 28 to a somewhat greater extent than was previously required in the same position of the handle 62 before the piston 26 is moved to a position to permit the supply valve 22 to be seated, and the pressure of the fluid in the pressure chamber 15 and in the brake cylinder 4 must increase to a somewhat higher value than before in order to move piston 26 this distance against the spring 28.

It will be seen, therefore, that on operation of the door engine 5 to open the vehicle doors the load responsive mechanism is rendered operative so that on a subsequent increase in the load on the vehicle the self-lapping brake valve device is automatically conditioned to produce a somewhat higher pressure in the brake cylinder, and a corresponding increase in the braking effect on the vehicle for a given amount of movement of the operating handle 62 of the self-lapping valve device.

The pressure which the self-lapping valve device is operative to produce in the pressure chamber 15 and in the brake cylinder 4 varies with the amount of movement of the handle 62, and on movement of this handle to the extreme point in its range of movement after the load responsive mechanism has been operated to increase the pressure of the fluid supplied by the self-lapping valve device, this valve device will operate to produce a higher pressure in the brake cylinder 4 than is produced by movement of the operating handle 62 to the same point in its range of movement before operation of the load responsive mechanism to change the adjustment of the self-lapping valve device.

On subsequent movement of the handle 62 to the release position the self-lapping valve mechanism operates substantially as described in detail above to release fluid under pressure from the pressure chamber 15 and the brake cylinder 4 through the ports 44 and the atomspheric passage 36.

On the subsequent supply of fluid under pressure by way of the pipe 68 to the door engine 5 to effect operation of this door engine to open the doors of the vehicle, the pawl 112 is again released and the load responsive mechanism is again operative to adjust the position of the spring seat 30 in accordance with the load on the vehicle, and thereby modify the operation of the self-lapping valve device to cause this valve device to supply fluid under pressure in accordance with the load on the vehicle.

If there is a reduction in the load on the vehicle this brake equipment will also operate automatically to modify the adjustment of the self-lapping valve device so that this valve device will thereafter operate to supply fluid at pressures somewhat lower than previously, thereby decreasing the braking effect on the vehicle.

Thus it will be seen if fluid under pressure is supplied by way of the pipe 68 to the door engine 5 to open the vehicle doors fluid will flow from the pipe 68 by way of the pipe and passage 126 and through the choke 130 to the chamber 124, and therefrom by way of the passage 158 to the chamber 122 and the face of the piston 72. On an increase in the pressure of the fluid in the chamber 122 the piston 72 will be moved downwardly against the spring 74, thereby causing the lever 76 to pivot on the lower end of the link 92 with the result that the link 78 is moved downwardly and the bell crank 80 is turned in a counter-clockwise direction about the pin 82. This movement of the bell crank 80 is transmitted through the link 84 to the bell crank 86 to move it in a clockwise direction about the pin 88 until the end of the arm thereof engages the projection 89 associated with the unsprung portion 90 of the vehicle truck to prevent further downward movement of the piston 72.

On a further increase in the pressure of the fluid in the chamber 124 the valve piston 134 is moved away from the seat rib 132 so as to permit fluid under pressure to flow to the chamber 120 to release the pawl 112, while the valve element 154 is moved to the seated position to cut off the flow of fluid to the chamber 122.

On the supply of fluid under pressure to the door engine 5 this engine operates to open the vehicle doors and permit the discharge of passengers from the vehicle. This reduction in the load on the vehicle permits the vehicle springs to expand, and causes the body portion of the vehicle to be moved away from the unsprung portion 90 of the vehicle truck.

At this time, as the vehicle is standing, the brakes will be applied to prevent unintended movement of the vehicle while passengers are alighting therefrom, and, as a result, fluid under pressure will be present in the pressure chamber 15 and in the brake cylinder 4.

The fluid under pressure present in the chamber 15 exerts force on the piston 26 to compress the spring 28, and this force is transmitted through the spring 28 to the spring seat 30 and thence through the stem 104 to the roller 102. When the pawl 112 is released the force exerted on the roller 102 carried by the arm 100 of the lever 96 moves the lever 96 in a counterclockwise direction about the pin 98, thereby moving the lower end of the arm 106 of the lever 96 to the right, as viewed in the drawing, and moving the ratchet bar 110 to the right.

On this movement of the lever 96, the arm 94 thereof moves the link 92 upwardly thereby causing the lever 76 to pivot on the pin 77 and move the link 78 downwardly. This movement of the link 78 moves the bell crank 80 in a counterclockwise direction about the pin 82, and this movement of the bell crank 80 is transmitted through the link 84 to move the bell crank 86 in a clockwise direction about the pin 88 and thereby move the arm of this bell crank into engagement with the projection 89 on the portion 90 of the vehicle truck.

When the arm of the bell crank 86 engages the projection 89 further movement of the bell crank 86 is prevented, and this bell crank operates through the connecting links and levers to prevent further movement of the lever 96, the ratchet bar 110, the spring seat 30, the spring 28 and teh piston 26 by the fluid in the chamber 15.

The amount of movement permitted the bell crank 86 is determined by the change in the relative positions of the vehicle body and truck, which in turn is determined by the change in the load on the vehicle. The amount of movement permitted the spring seat 30, and the change in the adjustment of the self lapping valve device, are regulated, therefore, by the change in the load on the vehicle.

On this movement of the spring seat 30 and piston 26, the spring 46 associated with the release valve 42 expands and maintains the release valve 42 in engagement with the roller 58, while the seat on the piston 26 is moved away from the release valve 42 to permit fluid under pressure to escape from the pressure chamber 15 and the brake cylinder 4 through the ports 44 until the pressure of the fluid in the chamber 15 has reduced by an amount sufficient to permit the spring 28 to expand far enough to move the piston 26 to a position in which the seat thereon again engages the end of the release valve 42 to cut off the further release of the fluid under pressure from the pressure chamber 15 and the brake cylinder 4.

If the fluid under pressure is now released from the pipe 68 to operate the door engine 5 to effect closing of the vehicle doors, fluid is released also from the chamber at the face of the valve piston 134 and this valve piston is moved to the position to release fluid from the chamber 120 intermediate the pistons 114 and 116 to permit the spring 118 to move the pawl 112 into engagement with the teeth on the ratchet bar 110, and to unseat the valve element 154 to release fluid under pressure from the chamber 122 at the face of the piston 72.

On a subsequent application of the brakes following the release of the brakes, as the spring seat 30 has been moved to the left as a result of the changes in the adjustment of the load responsive mechanism, the piston 26 must compress the spring 28 only to a somewhat smaller degree than was previously required in the same position of the handle 62 before the piston 26 is moved to a position to permit the supply valve 22 to be seated. The pressure of the fluid in the pressure chamber 15 and in the brake cylinder 4 must, therefore, increase only to a somewhat lesser value than was previously required in the same position of the handle 62 before the supply of fluid under pressure to the brake cylinder 4 is cut off, and the degree of braking on the vehicle is accordingly reduced.

While one embodiment of the improved variable load brake provided by my invention has been illustrated and described in detail, it should be understood that the invention is not limited to these details of construction, and that numerous changes and modifications may be made without departing from the scope of the following claim.

Having now described my invention, what I claim as new, and desire to secure by Letters Patent, is:

In a vehicle fluid pressure brake equipment, in combination, application means operative on an increase in fluid pressure to effect an application of the brakes, a self-lapping brake valve device comprising a movable abutment, valve means movable by said abutment and also movable relative to said abutment for controlling the supply and release of fluid under pressure to and from the application means, a spring seat, a spring extending between said spring seat and said abutment, said abutment being subject to the opposing pressures of the fluid supplied to said application means and of said spring, manual means independent of said abutment for moving said valve means relative to said abutment, and means responsive to the load on the vehicle for adjusting the spring seat relative to said abutment and thereby varying the force exerted by said spring on said abutment.

JOHN W. RUSH.